United States Patent
Chang (10) Patent No.: US 9,674,668 B2
(45) Date of Patent: Jun. 6, 2017

(54) METHOD, ELECTRONIC APPARATUS AND COMPUTER READABLE MEDIUM FOR DETERMINING RELATIVE POSITION OF APPARATUS

(71) Applicant: HTC Corporation, Taoyuan County (TW)

(72) Inventor: Yu-Hsien Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 571 days.

(21) Appl. No.: 14/221,284

(22) Filed: Mar. 21, 2014

(65) Prior Publication Data
US 2015/0271646 A1    Sep. 24, 2015

(51) Int. Cl.
*H04W 4/04*    (2009.01)
*H04W 4/02*    (2009.01)

(52) U.S. Cl.
CPC ............. *H04W 4/04* (2013.01); *H04W 4/027* (2013.01); *H04W 4/028* (2013.01)

(58) Field of Classification Search
None
See application file for complete search history.

(56) References Cited

U.S. PATENT DOCUMENTS 5,926,765 A    7/1999    Sasaki

| | | | |
|---|---|---|---|
| 2004/0033808 A1* | 2/2004 | Rorabaugh | G01S 5/0289 455/456.1 |
| 2006/0061469 A1* | 3/2006 | Jaeger | B60R 25/00 340/539.13 |
| 2007/0279237 A1* | 12/2007 | Julian | G01S 5/0284 340/686.1 |

(Continued)

FOREIGN PATENT DOCUMENTS

| CN | 1684112 | 10/2005 |
|---|---|---|
| CN | 1867836 | 11/2006 |
| CN | 101094024 | 12/2007 |

OTHER PUBLICATIONS

"Office Action of Taiwan Counterpart Application", issued on Oct. 19, 2015, p. 1-p. 13, in which the listed references were cited.

(Continued)

*Primary Examiner* — Daniel Lai
(74) *Attorney, Agent, or Firm* — Jianq Chyun IP Office (57) ABSTRACT

A method, an electronic apparatus, and a computer readable medium for determining a relative position of an apparatus, adapted for a first electronic apparatus to determine a relative position of a second electronic apparatus, are provided. In the method, a distance between the first and the second electronic apparatus is computed according to a wireless signal transmitted between the first and the second electronic apparatus. After one unit time and two unit time, distances between the first and the second electronic apparatus are computed according to the wireless signal and a displacement that the second electronic apparatus moves within each unit time is computed, respectively. Finally, a relative position of the second electronic apparatus relative to the first electronic apparatus is computed according to the distances and the displacements by using a current position of the first electronic apparatus as a reference point.

18 Claims, 5 Drawing Sheets

(56) References Cited

U.S. PATENT DOCUMENTS

| | | | |
|---|---|---|---|
| 2013/0038490 A1 | 2/2013 | Garcia | |
| 2013/0324164 A1* | 12/2013 | Vulcano | H04W 4/02 455/457 |
| 2014/0064258 A1* | 3/2014 | Montag | H04W 84/12 370/338 |
| 2014/0206381 A1* | 7/2014 | Yamada | G01S 5/14 455/456.1 |
| 2014/0241189 A1* | 8/2014 | Larsen | H04W 4/023 370/252 |
| 2015/0281881 A1* | 10/2015 | Appleby | E21C 39/00 715/848 |

OTHER PUBLICATIONS

"First Office Action of China Counterpart Application", issued on Nov. 30, 2016, p. 1-p. 11.

\* cited by examiner

METHOD, ELECTRONIC APPARATUS AND COMPUTER READABLE MEDIUM FOR DETERMINING RELATIVE POSITION OF APPARATUS

BACKGROUND

Technical Field

The disclosure relates to a positioning technique, and particularly, to a method and an electronic apparatus for determining a relative position of an apparatus.

Description of Related Art

With the continuous advancement and improvement of electronic technology and communication techniques, compact and portable electronic apparatuses, such as cell phones, and smartphones, are also evolving. These mobile apparatuses in the market integrate multiple functions in order to enhance their competence. In addition to common functions including photographing, telephoning, and Internet surfing, nowadays, even the Global Positioning System (GPS) and electronic maps are integrated into handheld communication apparatuses, enabling users to be aware of their positions at any time and any place by using the positioning function of the mobile apparatuses.

The GPS is a positioning technique that combines satellite technology with wireless communication, providing precise information of positioning, speed, and time. The GPS may be combined with an electronic map, so as to display the positioning information obtained by positioning on the electronic map for the user to know his/her current position.

However, the GPS is only applicable at places where satellite signals are available. When the user enters a place (e.g. a room) where the GPS is unable to receive satellite signals or when the user does not have the GPS positioning function turned on, the GPS positioning function will not work. At this moment, if the user wants to know his/her position or wants to know a relative position of another person in that place, generally, the only way is that both people observe by themselves the characteristics of surrounding buildings or objects, and then inform each other of the characteristics by phone to facilitate searching. Consequently, a large amount of time tends to be spent on the searching process. Therefore, it is necessary to provide a positioning method that is applicable indoors to help the user learn relative positions of other people relative to himself/herself.

SUMMARY OF THE APPLICATION

The disclosure provides a method, an electronic apparatus, and a computer readable medium for determining a relative position of an apparatus, enabling an electronic apparatus to obtain a relative position of another electronic apparatus relative to itself.

The method for determining a relative position of an apparatus according to the disclosure is adapted for a first electronic apparatus to detect and determine a relative position of a second electronic apparatus nearby. In this method, according to a wireless signal between the first and the second electronic apparatus, a first distance between the first and the second electronic apparatus is computed. After a first unit time, a second distance between the first and the second electronic apparatus is computed according to the wireless signal, and a first displacement that the first electronic apparatus moves within the first unit time is computed. Then, after a second unit time, a third distance between the first and the second electronic apparatus is computed according to the wireless signal, and a second displacement that the first electronic apparatus moves within the second unit time is computed. Finally, a current position of the first electronic apparatus is used as a reference point to compute a first relative position of the second electronic apparatus relative to the first electronic apparatus according to the first distance, the first displacement and the second distance, and the second displacement and the third distance.

In an example of the disclosure, further in the method, after (k−1) unit time, a k-th distance between the first and the second electronic apparatus is computed according to the wireless signal. After k unit time, a (k+1)-th distance between the first and the second electronic apparatus is computed according to the wireless signal, and a k-th displacement that the first electronic apparatus moves within the k-th unit time is computed, wherein k is a positive integer. According to the k-th displacement, the (k+1)-th distance and the k-th distance, a minimum error value between a k-th relative position of the second electronic apparatus relative to the first electronic apparatus at the (k−1)-th unit time and a (k+1)-th relative position of the second electronic apparatus relative to the first electronic apparatus after the k-th unit time is computed, so as to determine the k-th relative position of the second electronic apparatus relative to the first electronic apparatus.

In an example of the disclosure, further in the method, the previously computed first to k-th relative positions of the second electronic apparatus relative to the first electronic apparatus are accessed. The first to k-th relative positions are corrected respectively as k corrected positions relative to the reference point according to the first to k-th displacements by using the current position of the first electronic apparatus as a reference point. The corrected positions are displayed through a graphical interface with the reference point at the center, so as to indicate a moving trajectory of the second electronic apparatus relative to the reference point.

In an example of the disclosure, further in the method, after the steps of computing the first displacement that the first electronic apparatus moves within the first unit time, and of computing the second distance of the second electronic apparatus relative to the first electronic apparatus according to the wireless signal, the second electronic apparatus computes a third displacement that the second electronic apparatus moves within the first unit time and transmits the third displacement to the first electronic apparatus. Then, the first relative position of the second electronic apparatus relative to the first electronic apparatus is computed according to the first distance, a difference between the first displacement and the third displacement, and the second distance and by using the first electronic apparatus as the reference point.

In an example of the disclosure, the step of computing the first distance between the first and the second electronic apparatus according to the wireless signal between the first and the second electronic apparatus includes the following steps. The wireless signal is transmitted, then a feedback signal returned from the second electronic apparatus in response to the wireless signal is received, and then a round-trip time from transmission of the wireless signal until receipt of the feedback signal is computed, so as to compute the first distance according to the round-trip time and a transmission speed of the wireless signal.

In an example of the disclosure, the step of computing the first distance between the first and the second electronic apparatus includes the following steps. The wireless signal is transmitted, then the feedback signal returned from the second electronic apparatus in response to the wireless signal is received, and then a signal strength of the feedback signal is compared with a distance conversion table, so as to obtain the first distance.

In an example of the disclosure, the step of computing the first distance between the first and the second electronic apparatus further includes initiating a specific application program, and communicating with the second electronic apparatus in a near-field communication manner so as to perform an authentication and/or pairing procedure.

In an example of the disclosure, in the step of computing the first displacement that the first electronic apparatus moves within the first unit time, the first displacement is computed by using sensing information received by an accelerometer, a gyro sensor, and a compass.

In an example of the disclosure, further in the method, after the step of computing the first relative position of the second electronic apparatus relative to the first electronic apparatus, the first relative position is displayed through a graphical interface with the reference point at the center.

In an example of the disclosure, further in the method, after the unit time, a positioning unit is used for positioning the first electronic apparatus, so as to obtain a first absolute position of the first electronic apparatus. Then, a second absolute position of the second electronic apparatus is computed according to the first absolute position and the first relative position.

In an example of the disclosure, further in the method, after the unit time, the second electronic apparatus pertains positioning using the positioning unit, so as to obtain the second absolute position and transmit the second absolute position to the first electronic apparatus, so that the first electronic apparatus computes the first absolute position of the first electronic apparatus according to the second absolute position and the first relative position.

The electronic apparatus for determining a relative position of an apparatus according to the disclosure includes a wireless communication unit, a sensor, a storage unit and a processing unit, wherein the wireless communication unit is configured to transmit a wireless signal between the electronic apparatus and a second electronic apparatus; the storage unit is configured to record modules; and the processing unit is connected to the wireless communication unit, the sensor and the storage unit, and is configured to access and execute the modules recorded in the storage unit. The modules include a distance computation module, a displacement computation module and a relative-position computation module, wherein the distance computation module computes a first distance between the electronic apparatus and the second electronic apparatus according to the wireless signal. After a first unit time, the distance computation module computes a second distance between the electronic apparatus and the second electronic apparatus according to the wireless signal, and the displacement computation module uses the sensor for detecting and computing a first displacement that the electronic apparatus moves within the first unit time. Then, after a second unit time, the distance computation module computes a third distance between the electronic apparatus and the second electronic apparatus according to the wireless signal, and the displacement computation module uses the sensor for detecting and computing a second displacement that the electronic apparatus moves within the second unit time. The relative-position computation module computes a first relative position of the second electronic apparatus relative to the electronic apparatus according to the first distance, the first displacement and the second distance, and the second displacement and the third distance and by using a current position of the electronic apparatus as a reference point.

In an example of the disclosure, after (k−1) unit time, the distance computation module uses the wireless communication unit for transmitting the wireless signal so as to detect the second electronic apparatus; after k unit time, the distance computation module computes a (k+1)-th distance between the electronic apparatus and the second electronic apparatus according to the wireless signal, and the displacement computation module uses the sensor for computing the k-th displacement that the electronic apparatus moves within the k-th unit time, wherein k is a positive integer. Moreover, according to the k-th displacement, the k-th distance and the (k+1)-th distance, the relative-position computation module computes a minimum error value between a k-th relative position of the second electronic apparatus relative to the electronic apparatus at the (k−1)-th unit time and a (k+1)-th relative position of the second electronic apparatus relative to the electronic apparatus after the k-th unit time, so as to determine the k-th relative position of the second electronic apparatus relative to the electronic apparatus according to the above computation result.

In an example of the disclosure, the electronic apparatus further includes a display unit, and the modules of the electronic apparatus further include a display module. The relative-position computation module accesses the previously computed first to k-th relative positions of the second electronic apparatus relative to the electronic apparatus via the storage unit, and corrects the first to k-th relative positions respectively as k corrected positions relative to the reference point according to the first displacement to k-th displacements by using the current position of the electronic apparatus as the reference point. The display module displays the corrected positions on the display unit through a graphical interface with the reference point at the center, so as to indicate the moving trajectory of the second electronic apparatus relative to the reference point.

In an example of the disclosure, the second electronic apparatus computes the second displacement that the second electronic apparatus moves within a unit time and transmits the second displacement to the electronic apparatus. The relative-position computation module further computes the first relative position of the second electronic apparatus relative to the electronic apparatus according to a triangle inequality by using the electronic apparatus as the reference point, and using the first distance, a difference between the first displacement and the second displacement, and the second distance as three sides of a triangle.

In an example of the disclosure, the electronic apparatus further includes a specific application program, wherein after the specific application program is initiated, the electronic apparatus communicates with the second electronic apparatus in a near-field communication manner, so as to perform an authentication and/or pairing procedure.

In an example of the disclosure, the distance computation module further transmits the wireless signal and receives the feedback signal returned from the second electronic apparatus in response to the wireless signal by using the wireless communication unit. Moreover, the distance computation module further compares a signal strength of the feedback signal with a distance conversion table, so as to obtain the first distance.

In an example of the disclosure, the sensor includes one or a combination of an accelerometer, a gyro sensor, and a compass.

In an example of the disclosure, the electronic apparatus further includes a positioning system, and the positioning system is connected to the processing unit. The positioning system positions the electronic apparatus so as to obtain a first absolute position of the electronic apparatus. Moreover, the modules further include an absolute-position computation module, and the absolute-position computation module further computes a second absolute position of the second electronic apparatus according to the first absolute position and the first relative position.

In an example of the disclosure, the second electronic apparatus further performs positioning by using a positioning system to obtain a second absolute position and transmit the second absolute position to the electronic apparatus. Moreover, the modules further include an absolute-position computation module, and the absolute-position computation module computes the first absolute position of the electronic apparatus according to the second absolute position and the first relative position.

The disclosure also provides a non-transitory computer readable medium having a computer program recorded therein. The computer program is loaded by a first electronic apparatus to execute the following steps. First, a first distance between the first electronic apparatus and a second electronic apparatus is computed according to a wireless signal between the first and the second electronic apparatus. After a first unit time, a second distance between the first and the second electronic apparatus is computed according to the wireless signal, and a first displacement that the first electronic apparatus moves within the first unit time is computed. Then, after a second unit time, a third distance between the first and the second electronic apparatus is computed according to the wireless signal, and a second displacement that the first electronic apparatus moves within the second unit time is computed. Finally, a first relative position of the second electronic apparatus relative to the first electronic apparatus is computed according to the first distance, the first displacement and the second distance, and the second displacement and the third distance and by using a current position of the first electronic apparatus as a reference point.

Based on the above, in the method, the electronic apparatus and the computer readable medium for determining a relative position of an apparatus according to the disclosure, the distances between the electronic apparatus and the second electronic apparatus before and after a unit time are respectively detected and computed according to the wireless signal, and the displacement that the electronic apparatus moves within the unit time is computed. According to the above displacement and the distances computed at two different time points, the relative position of the second electronic apparatus relative to the electronic apparatus is computed. Accordingly, without using a positioning system, the user still learns the relative position of another apparatus relative to himself/herself using the distance to the another apparatus and his/her own displacement.

To make the above features and advantages of the disclosure more comprehensible, examples accompanied with drawings are described in detail as follows.

DETAILED DESCRIPTION OF DISCLOSED EXAMPLES

In the disclosure, an electronic apparatus detects other electronic apparatuses nearby through wireless signals, and calculates distances between the electronic apparatus and the other electronic apparatuses before and after a unit time according to information such as signal strengths of feedback signals from these electronic apparatuses or round-trip time of the signals. Meanwhile, in the disclosure, a displacement that the electronic apparatus moves within the unit time is detected and computed by using a sensor such as an accelerometer, a gyro sensor, an electronic compass, and so on provided on the electronic apparatus itself. The displacement is then combined with the distance information between the apparatuses, and relative positions of the other electronic apparatuses relative to the electronic apparatus are calculated using, for example, triangulation. Finally, the relative positions of these electronic apparatuses are displayed on a screen of the electronic apparatus through a graphical interface, and moving trajectories of these electronic apparatuses are also displayed. Accordingly, a user may learn the relative positions of the other electronic apparatuses from the graphical interface displayed by the electronic apparatus, and finds the users of the other electronic apparatuses easier by referring to the trajectories and paths of movement.

Figure 1:
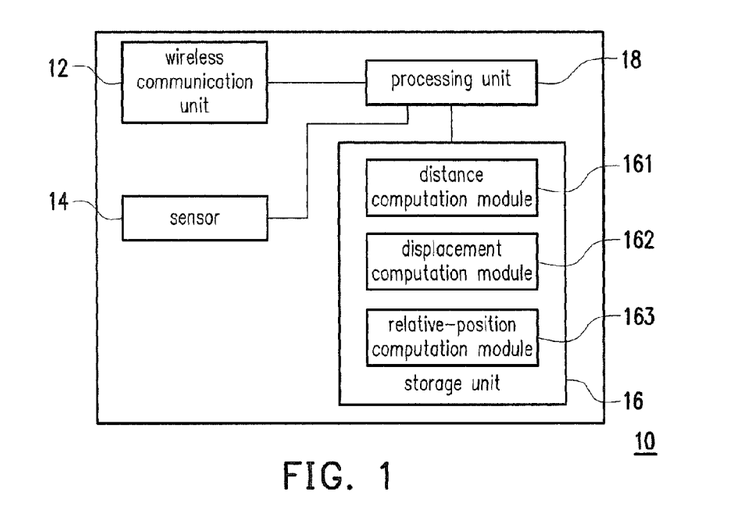
FIG. 1 is a block diagram of an electronic apparatus for determining a relative position of an apparatus according to an example of the disclosure.

FIG. 1 is a block diagram of an electronic apparatus for determining a relative position of an electronic apparatus according to an example of the disclosure. Referring to FIG. 1, an electronic apparatus 10 of the present example includes a wireless communication unit 12, a sensor 14, a storage unit 16, and a processing unit 18. The electronic apparatus 10 is, for example, a mobile electronic apparatus, which includes an electronic apparatus such as a cell phone, a tablet PC, a notebook computer, or an in-car electronic apparatus, but is not limited thereto.

The wireless communication unit 12 supports at least one of, but is not limited to, the following wireless signal transmission techniques: wireless communication techniques such as Wi-Fi Direct, Bluetooth, near-field communication (NFC), or device-to-device (D2D) communication.

The sensor 14 may be a sensor for detecting information related to movement of an electronic apparatus, such as an accelerometer, a gyro sensor, an electronic compass, or a combination of these sensors.

The storage unit 16 may be any type of fixed or portable random access memory (RAM), read-only memory (ROM), flash memory or a similar device or a combination of the above devices. In the present example, the storage unit 16 is configured to record a distance computation module 161, a displacement computation module 162 and a relative-position computation module 163. These modules are, for example, programs stored in the storage unit 16 to be loaded into the processing unit 18 of the electronic apparatus 10 to execute the function of determining a relative position of an apparatus.

The processing unit 18 is connected to the wireless communication unit 12, the sensor 14, and the storage unit 16. The processing unit 18 may be a central processing unit (CPU), or a programmable general purpose or special purpose microprocessor, a digital signal processor (DSP), a programmable controller, an application specific integrated circuit (ASIC), or any other similar device, or a combination of the above devices. In the present example, the processing unit 18 is configured to access and execute the modules recorded in the storage unit 16, thereby realizing the method for determining a relative position of an apparatus according to the examples of the disclosure.

Figure 2:
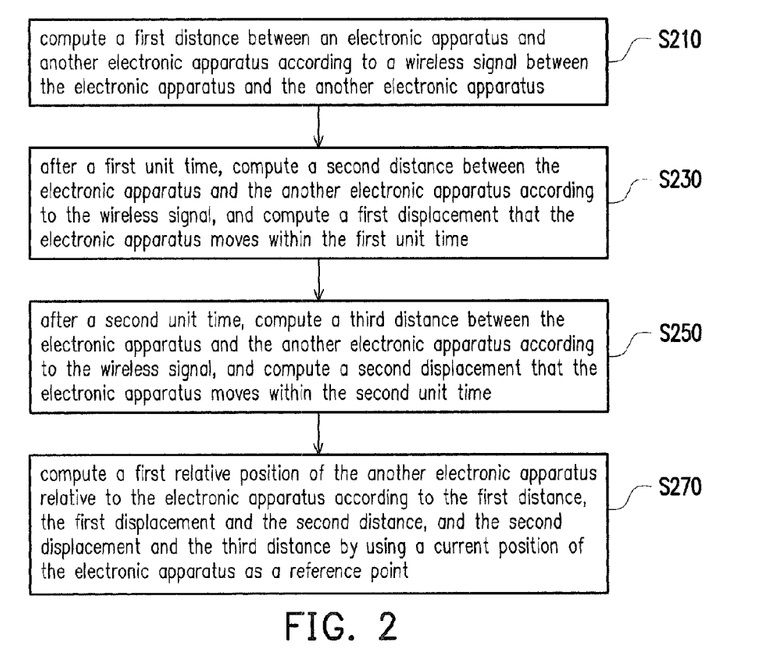
FIG. 2 is a flow chart of a method for determining a relative position of an apparatus according to an example of the disclosure.
Figure 3:
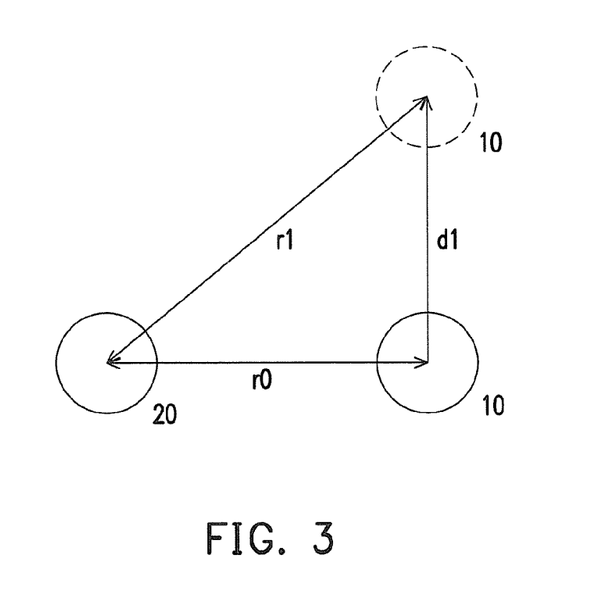
FIG. 3 is a schematic diagram of the method for determining a relative position of an apparatus according to an example of the disclosure.

FIG. 2 is a flow chart of a method for determining a relative position of an apparatus according to an example of the disclosure. FIG. 3 is a schematic diagram of the method for determining a relative position of an apparatus according to an example of the disclosure. Referring to FIG. 1, FIG. 2, and FIG. 3 together, the method of the present example is applicable to the electronic apparatus 10, wherein FIG. 3 illustrates a position relationship between the electronic apparatus 10 and another electronic apparatus 20 nearby. In the following, the method of the present example is described in detail with reference to the devices of the electronic apparatus 10 in FIG. 1.

In step S210, the distance computation module 161 computes a first distance $r_0$ between the electronic apparatus 10 and the electronic apparatus 20 according to a wireless signal transmitted between the wireless communication unit 12 and the electronic apparatus 20. In an example, by using the time that has elapsed between the wireless communication unit 12 transmits the wireless signal and the wireless communication unit 12 receives a feedback signal returned from the electronic apparatus 20, or by using signal strengths, the distance computation module 161 calculates the distance between the electronic apparatus 10 and the electronic apparatus 20.

In detail, in an example, the distance computation module 161 uses the wireless communication unit 12 for transmitting the wireless signal and receiving the feedback signal returned from the electronic apparatus 20 in response to the wireless signal, and accordingly computes a round-trip time (RTT) between the wireless communication unit 12 transmits the wireless signal and the wireless communication unit 12 receives the feedback signal. Finally, according to the round-trip time and a transmission speed of the wireless signal, the distance computation module 161 calculates the first distance $r_0$ between the electronic apparatus 10 and the electronic apparatus 20. The first distance $r_0$ is, for example, half the product of the round-trip time and the transmission speed of the wireless signal. The distance computation module 161 computes the round-trip time by the wireless communication unit 12 transmitting an Internet control message protocol (ICMP) packet or other data to the electronic apparatus 20. However, the disclosure is not limited thereto.

In another example, according to the signal strength of the feedback signal returned from the electronic apparatus 20 in response to the wireless signal that is detected by the wireless communication unit 12, or the signal strength of the wireless signal actively transmitted by the electronic apparatus 20 itself, the distance computation module 161 obtains the first distance $r_0$ by, for example, comparing the signal strengths with a distance conversion table. Specifically, after receiving the feedback signal through the wireless communication unit 12, according to the signal strength of this feedback signal, the distance computation module 161 looks up a signal strength-distance conversion table pre-stored in the storage unit 16, thus obtains the distance to which the signal strength of the feedback signal corresponds, and uses it as the first distance $r_0$ between the electronic apparatus 10 and the electronic apparatus 20.

It is to be noted that in an example, before detecting the electronic apparatus 20, the electronic apparatus 10 first communicates with the electronic apparatus 20 by using the wireless communication techniques (e.g. Wi-Fi Direct, Bluetooth, NFC, etc.) supported by the wireless communication unit 12 in combination with specific application programs or network services, so as to perform an authentication or pairing procedure, thereby establishing a channel for signal transmission. This communication action indicates that the electronic apparatus 10 intends to initiate a function of tracking a relative position of the electronic apparatus 20, which means the electronic apparatus 10 starts to determine the relative position of the electronic apparatus 20. After pairing, the electronic apparatus 10 and the electronic apparatus 20 transmit wireless signals therebetween via this channel, so as to estimate the distance. For example, two users respectively holding the electronic apparatus 10 and the electronic apparatus 20 perform communication in advance to complete the authentication or pairing, and then initiate the function of determining the relative positions of their counterparts when they want to know the relative positions of their counterparts. Or, the users perform communication for authentication or pairing only when there is a need to use the function of determining the relative positions of their counterparts. For example, the two users initiate a relevant application program and perform pairing in a near-field communication (NFC) manner, in which positions at which they perform the pairing are used as starting points to start to track the relative positions of their counterparts, so as to display the starting points and the moving trajectories of their counterparts on the electronic apparatuses.

In other examples, if the electronic apparatus 10 has obtained a device ID of the wireless communication unit of the electronic apparatus 20, during the pairing, the first distance $r_0$ between the electronic apparatus 10 and the electronic apparatus 20 is directly computed according to the signal strength of the feedback signal responded from the electronic apparatus 20. The above method for computing the first distance $r_0$ is merely exemplary, and persons who apply the present example may adjust the methods for measuring the round-trip time and signal strengths, or use other methods for computing the first distance $r_0$. These are not limited in the disclosure.

Referring back to the process in FIG. 2, after a unit time t, in step S230, the distance computation module 161 again transmits the wireless signal to detect the electronic apparatus 20 by using the wireless communication unit 12, and accordingly computes a second distance $r_1$ between the electronic apparatus 10 and the electronic apparatus 20. Meanwhile, the displacement computation module 162 computes a first displacement $d_1$ that the electronic apparatus 10 moves within the unit time t. The distance computation module 161 uses the same method for computing the second distance $r_1$ as that for computing the first distance $r_0$, and details thereof are omitted herein.

In the present example, the displacement computation module 162 detects the first displacement $d_1$ that the electronic apparatus 10 moves within the unit time t by using a sensor such as an accelerometer, a gyro sensor, an electronic compass, and so on provided on the electronic apparatus 10. Specifically, a triaxial accelerometer can detect accelerated movement in three axial directions, and a displacement amount in each axial direction is computed by the detected acceleration. For example, the displacement amount is obtained by performing two integrations on the acceleration. In addition, the gyro sensor can detect a rotational amount of the electronic apparatus 10, and the electronic compass can detect an orientation of the electronic apparatus 10. Accordingly, the electronic apparatus 10 learns the distance and direction of movement of the first displacement $d_1$ by a positioning method such as dead reckoning (DR) or inertial navigation.

Then, after another unit time t (i.e. after a total of two unit time t), in step S250, the distance computation module 161 again transmits the wireless signal to detect the electronic apparatus 20 by using the wireless communication unit 12, and accordingly computes a third distance $r_2$ between the electronic apparatus 10 and the electronic apparatus 20. Meanwhile, the displacement computation module 162 computes a second displacement $d_2$ that the electronic apparatus 10 moves within the unit time t. The distance computation module 161 computes the third distance $r_2$ by using the same method as that for computing the first distance $r_0$, and details thereof are omitted herein.

Finally, in step S270, the relative-position computation module 163 computes a first relative position of the electronic apparatus 20 relative to the electronic apparatus 10 according to the previously computed first distance $r_0$, first displacement $d_1$ and second distance $r_1$, and second displacement $d_2$ and third distance $r_2$ by using a current position of the electronic apparatus 10 as a reference point. The relative-position computation module 163, for example, first takes the previously computed first distance $r_0$, first displacement $d_1$ and second distance $r_1$ as three sides of a triangle, so as to compute the relative position of the electronic apparatus 20 relative to the electronic apparatus 10 after the unit time t by using a triangle inequality. Then, the previously computed second distance $r_1$, second displacement $d_2$ and third distance $r_2$ are taken as three sides of a triangle, so as to compute the relative position of the electronic apparatus 20 relative to the electronic apparatus 10 after two unit time t by using a triangle inequality. In the present example, the second distance $r_1$, the second displacement $d_2$, and the third distance $r_2$ are further used to compute the position of the electronic apparatus 20 after the second unit time t. Then, this position is compared to the position of the electronic apparatus 20 after the first unit time t, so as to further determine the position of the electronic apparatus 20.

Figure 4A:
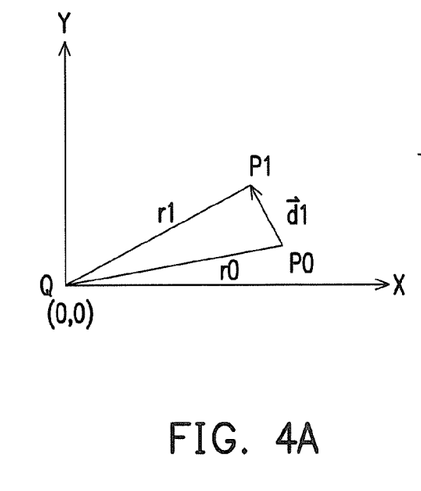
FIG. 4A and FIG. 4B illustrate an example of the method for determining a relative position of an apparatus according to an example of the disclosure.

Specifically, FIG. 4A and FIG. 4B illustrate an example of the method for determining a relative position of an apparatus according to an example of the disclosure. Referring to FIG. 3 and FIG. 4A together, in FIG. 4A, a point Q (i.e. coordinates (0,0)) represents the position of the electronic apparatus 20 in FIG. 3, and points $P_0$ and $P_1$ respectively indicate the position of the electronic apparatus 10 before the unit time t and the current position of the electronic apparatus 10.

The distance $r_0$ from the point $P_0$ to the point Q in FIG. 4A is the first distance $r_0$ in FIG. 3. The distance $r_1$ from the point $P_1$ to the point Q in FIG. 4A is the second distance $r_1$ in FIG. 3. The vector $\bar{d}_1=(d_x,d_y)$ in FIG. 4A is the first displacement $d_1$ in FIG. 3. If a vector from the point Q to the point $P_1$ is defined as a vector $\bar{P}$, the vector $\bar{P}$ satisfies the following equations (1) and (2):

$$|\bar{P}|=r_1 \qquad (1)$$

$$|\bar{P}-\bar{d}_1|=r_0 \qquad (2)$$

The distances $r_0$, $r_1$ and the vector $\bar{d}_1$ in FIG. 4A are taken as three sides of a triangle, and according to a triangle inequality, equation (3) is obtained:

$$r_0-r_1 \leq |\bar{d}_1| \leq r_0+r_1, \qquad (3)$$

and by substituting equations (1) and (2) into equation (3), the coordinates $(P_x,P_y)$ of the point $P_1$ are obtained, wherein $$P_x=\tfrac{1}{2}*(K_x d_x \pm K_y d_y)/(d_y^2-d_x^2) \qquad (4)$$

$$P_y=(r_1^2-P_x^2)^{1/2}, \qquad (4)$$

and wherein $$K_x=r_0^2-r_1^2-r_d^2$$

$$K_y=\{[(r_1^2+r_d)^2-r_0^2][r_0^2-(r_1^2+r_d)^2]\}^{1/2}$$

$$r_d=|\bar{d}_1| \qquad (5)$$

Next, the point $P_1$ is used as a reference point, and according to the computed coordinates $(P_x,P_y)$, the relative position of the point Q relative to the point $P_1$ (i.e. the first relative position of the electronic apparatus 20 relative to the electronic apparatus 10) is obtained. To make it easy for the user to review the first relative position of the electronic apparatus 20 relative to the electronic apparatus 10, the electronic apparatus 10 further displays this first relative position on the display unit (not illustrated). This display unit may be a display such as a liquid crystal display (LCD), or an organic electro-luminescent display (OELD), but is not limited thereto.

Figure 4B:
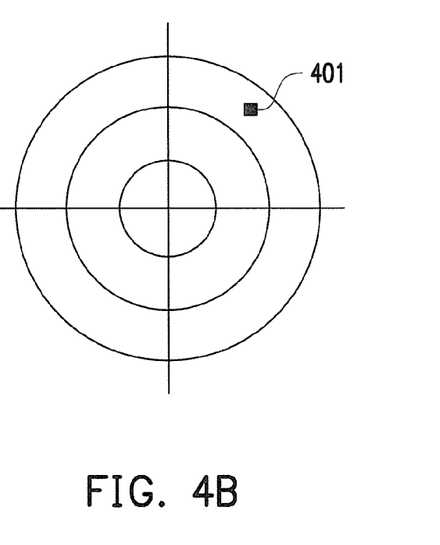

The electronic apparatus 10, for example, uses the display module (not illustrated) recorded in the storage unit 16 for displaying the first relative position on the display unit through a graphical interface with the reference point (i.e. the current position of the electronic apparatus 10) at the center. Referring to FIG. 4B, a plurality of concentric circles in FIG. 4B indicate different distances relative to the electronic apparatus 10. For example, the concentric circle closest to the center point indicates a distance of 10 m from the electronic apparatus 10. Meanings of the other concentric circles may be understood by analogy. The actual distances to which the concentric circles in FIG. 4B correspond are merely exemplary. In other example, the actual distances to which the concentric circles correspond vary depending on the relative position of the electronic apparatus 20 relative to the electronic apparatus 10, and are not limited to the above. A point 401 in FIG. 4B is the first relative position of the electronic apparatus 20 relative to the electronic apparatus 10.

Thus, without using the GPS, the user may directly use a point-to-point transmission technique (e.g. Wi-Fi Direct, Bluetooth, NFC, etc.) of the electronic apparatus to measure a distance between the electronic apparatus and another apparatus. Moreover, through detection by the sensor (e.g. a combination of sensors such as an accelerometer, a gyro sensor, a compass sensor, and so on) of the electronic apparatus, the user learns his/her own displacement, thereby calculating the relative positions of the other apparatuses nearby relative to himself/herself. For example, when a user is at a crowded indoor concert or shopping mall with his/her friend, the user can know the position of his/her friend through the electronic apparatus of the examples of the disclosure; when a user is at a large parking lot, the user can know the position of his/her parked vehicle through the electronic apparatus of the examples of the disclosure: for example, when the electronic apparatus determines that a connection between itself and the vehicle is disconnected, it means that the user has gotten off and left the vehicle, and then the electronic apparatus starts to detect the displacement after leaving the vehicle, which make the user can go back to locate the position of the parked vehicle along the path of displacement. Or, when the user is located outdoors or at a department store with a child, not only the position and moving trajectory of the child can be obtained through the electronic apparatus of the examples of the disclosure, but also when the child is outside a set distance range (e.g. 200 m), the parent's electronic apparatus may generate an alert message (e.g. by making a sound or displaying an alert message on the display unit) to notify the user, or the child's electronic apparatus may generate an alert message to remind the child that he/she has gone beyond the distance range set by the parent. At this moment, the parent can quickly find the child by referring to the position of the child's electronic apparatus displayed on the patent's electronic apparatus and to the moving trajectory of the child's electronic apparatus. If the parent's electronic apparatus itself has moved, the position of the child is found by referring to the moving trajectories of both the parent's and the child's electronic apparatuses.

In the above examples, the electronic apparatus learns the relative position of another apparatus relative to the electronic apparatus itself by two times of displacements. In another example, the method for determining a relative position of an apparatus according to the examples of the disclosure may further increase the precision of the computed relative position by several times of displacement.

Figure 5:
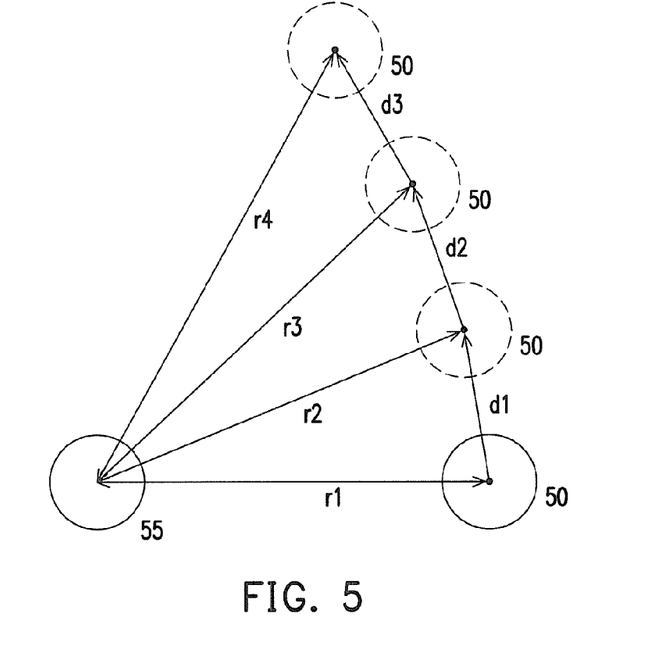
FIG. 5 is a schematic diagram of the method for determining a relative position of an apparatus according to another example of the disclosure.

For example, FIG. 5 is a schematic diagram of the method for determining a relative position of an apparatus according to another example of the disclosure. In FIG. 5, an electronic apparatus 50 is an apparatus held by the user, and an electronic apparatus 55 is an apparatus nearby the user. After each unit time t, the electronic apparatus 50 detects the electronic apparatus 55 according to the method in the above examples so as to compute distances $r_1$, $r_2$, $r_3$, and $r_4$ between the electronic apparatus 50 and the electronic apparatus 55, and also compute displacements $d_1$, $d_2$, and $d_3$ that the electronic apparatus 50 moves within each unit time t. Analogically, after k unit time t, the electronic apparatus 50 detects the electronic apparatus 55 by transmitting or receiving a wireless signal, computes the (k+1)-th distance between the electronic apparatus 50 and the electronic apparatus 55, and also computes a k-th displacement that the electronic apparatus 50 moves within the k-th unit time t, wherein k is a positive integer. Then, according to the k-th displacement, the k-th distance, and the (k+1)-th distance, the electronic apparatus 50 computes a minimum error value between a (k−1)-th relative position of the electronic apparatus 55 relative to the electronic apparatus 50 at the (k−1)-th unit time and a k-th relative position of the electronic apparatus 55 relative to the electronic apparatus 50 after the k-th unit time, so as to determine the k-th relative position of the electronic apparatus 55 relative to the electronic apparatus 50.

Figure 6A:
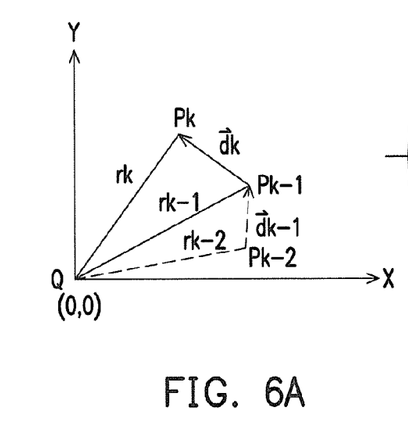
FIG. 6A and FIG. 6B illustrate an example of the method for determining a relative position of an apparatus according to another example of the disclosure.

Specifically, FIG. 6A and FIG. 6B illustrate an example of the method for determining a relative position of an apparatus according to another example of the disclosure. Referring to FIG. 5 and FIG. 6A together, in FIG. 6A, the point Q (i.e. coordinates (0,0)) represents the position of the electronic apparatus 55 in FIG. 5, and points $P_k$ and $P_{k-1}$ respectively indicate the positions of the electronic apparatus 50 at the k-th and (k−1)-th unit time t.

The distance between the point $P_{k-1}$ and the point Q in FIG. 6A is a distance $r_{k-1}$. The distance between the point $P_k$ and the point Q in FIG. 6A is a distance $r_k$. The vector $\overline{d}_k$ in FIG. 6A indicates a displacement that the electronic apparatus 50 moves within the k-th unit time t. If a vector from the point Q to the point $P_k$ is defined as a vector $\overline{P}_k$ and a vector from the point Q to the point $P_{k-1}$ is defined as a vector $\overline{P}_{k-1}$, since the distance $r_k$ and the vector $\overline{d}_k$ are values measured respectively by the wireless communication unit and the sensor, their errors $e_d$ and $e_r$ are computed respectively using the following equations (6) and (7):

$$e_d=|\overline{P}_k-(\overline{P}_{k-1}+\overline{d}_k)| \qquad (6)$$

$$e_r=|\overline{P}_k|-r_k \qquad (7)$$

Based on a maximum likelihood estimation method, it is assume that a combination error E is:

$$E=e_d^2+e_r^2, \qquad (8)$$

and the error E satisfies the following equations (9) and (10):

$$dE/d\overline{P}_k=0 \qquad (9)$$

$$d^2E/d\overline{P}_k^2>0 \qquad (10)$$

Finally, by minimizing this error E, the following is obtained:

$$\overline{P}_k=(\overline{P}_{k-1}+\overline{d}_k)*(|\overline{P}_{k-1}+\overline{d}_k|+r_k)/2 \qquad (11)$$

Accordingly, the method for determining a relative position of an apparatus according to the examples of the disclosure minimizes the measurement error, so as to determine the relative position of the electronic apparatus 55 relative to the electronic apparatus 50. In an example, the electronic apparatus 50 further uses the display module for displaying all of the previously computed relative positions of the electronic apparatus 55 relative to the electronic apparatus 50 on the display unit through a graphical interface, making it easy for the user to review the moving trajectory of the electronic apparatus 55.

For example, the electronic apparatus 50 accesses the previously computed first to (k−1)-th relative positions of the electronic apparatus 55 relative to the electronic apparatus 50, and uses the current position of the electronic apparatus 50 as the reference point to correct the first to (k−1)-th relative positions respectively as (k−1) corrected positions relative to the current reference point according to the previously computed first to (k−1)-th displacements (respectively using the current positions of the electronic apparatus after the first to (k−1)-th unit time as the reference points). For example, if the current position of the electronic apparatus 50 is used as the original point (0,0), when the fifth relative position of the electronic apparatus 55 relative to the electronic apparatus 50 is (7,8), the fourth relative position of the electronic apparatus 55 relative to the electronic apparatus 50 is (5,1), and the displacement at the previous unit time is (2,3), the fourth relative position is corrected as coordinates (3,−2). Other corrected positions may be inferred by analogy, and details thereof are omitted herein.

Figure 6B:
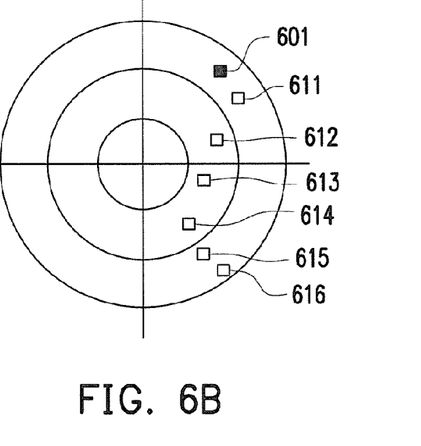

In addition, further in the electronic apparatus 50, with the reference point (i.e. the current position of the electronic apparatus 50) at the center, the display module displays the above corrected positions on the display unit through a graphical interface, so as to indicate the moving trajectory of the electronic apparatus 55 relative to the reference point. For example, referring to FIG. 6B, a point 601 in FIG. GB indicates the current relative position of the electronic apparatus 55 relative to the electronic apparatus 50, and points 611 to 616 respectively indicate corrected relative positions of the electronic apparatus 55 relative to the current position of the electronic apparatus 50 at each previous unit time.

In an example, the electronic apparatus 50 pre-stores or downloads in real time a map of its position, for example a map of the shopping mall, parking lot or other places, so that the display module displays this map in combination with the above moving trajectory on the display unit, thereby enabling the user to quickly find an optimal path to the position of the electronic apparatus 55 according to this "moving trajectory displayed on the map." In this example, the user selects the current position of the user's electronic apparatus 50 by clicking on the map or by selecting from a menu, or positions the current position of the electronic apparatus 50 by using a positioning system and displays it on the electronic map. In other examples, further in the electronic apparatus 50, a path planning module (not illustrated) is used for computing the optimal path for the user to go to the position of the electronic apparatus 55 according to the map information and moving trajectories. In other examples, the distance computation module may be used for computing a linear distance between the user and the electronic apparatus 55, and also for computing a path distance of the path planned by the path planning module.

Accordingly, the method for determining a relative position of an apparatus according to the examples of the disclosure provides the user with the moving trajectories of other nearby apparatuses relative to the current position of the user, thus making it easy for the user to understand the movement state of the other apparatuses, and further making it easy for the user to go to the positions of the other apparatuses. It is to be noted that all of the above examples are applicable in the case where the electronic apparatus 20 is fixed while the electronic apparatus 10 moves. In another example, when both the electronic apparatus 10 and the electronic apparatus 20 move, the method for determining a relative position of an apparatus according to the examples of the disclosure can also obtain the relative position of the electronic apparatus 20 relative to the electronic apparatus 10. In the following, another example is described in detail.

Figure 7:
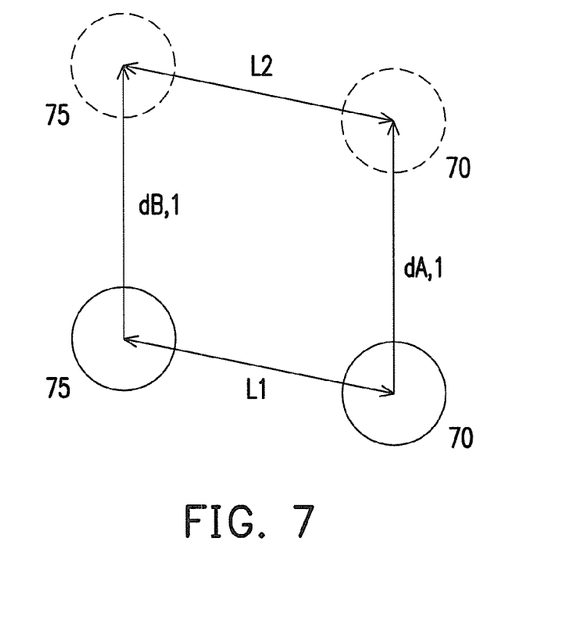
FIG. 7 is a schematic diagram of the method for determining a relative position of an apparatus according to still another example of the disclosure.

FIG. 7 is a schematic diagram of the method for determining a relative position of an apparatus according to still another example of the disclosure. In FIG. 7, an electronic apparatus 70 is an electronic apparatus held by the user, and an electronic apparatus 75 is an apparatus nearby the user. The electronic apparatus 70, for example, detects the electronic apparatus 75 before and after the unit time t according to the method described in the above examples and computes a first distance L1 and a second distance L2 between the electronic apparatus 70 and the electronic apparatus 75. Meanwhile, a first displacement $d_{A,1}$ that the electronic apparatus 70 moves within the unit time t is also computed. A difference from the previous examples is that, in the present example, the electronic apparatus 75 computes a second displacement $d_{B,1}$ that the electronic apparatus 75 moves within the unit time t, and transmits it to the electronic apparatus 70 via the wireless communication unit. The method for computing the second displacement $d_{B,1}$ may be understood by referring to the descriptions of FIGS. 2 and 3, and details thereof are omitted herein. Next, the electronic apparatus 70 uses its current position as the reference point, and uses the first distance L1, a difference between the first displacement $d_{A,1}$ and the second displacement $d_{B,1}$ and the second distance L2 as three sides of a triangle, so as to compute a first relative position of the electronic apparatus 75 relative to the reference point (i.e. the current position of the electronic apparatus 70) by using a triangle inequality.

Figure 8:
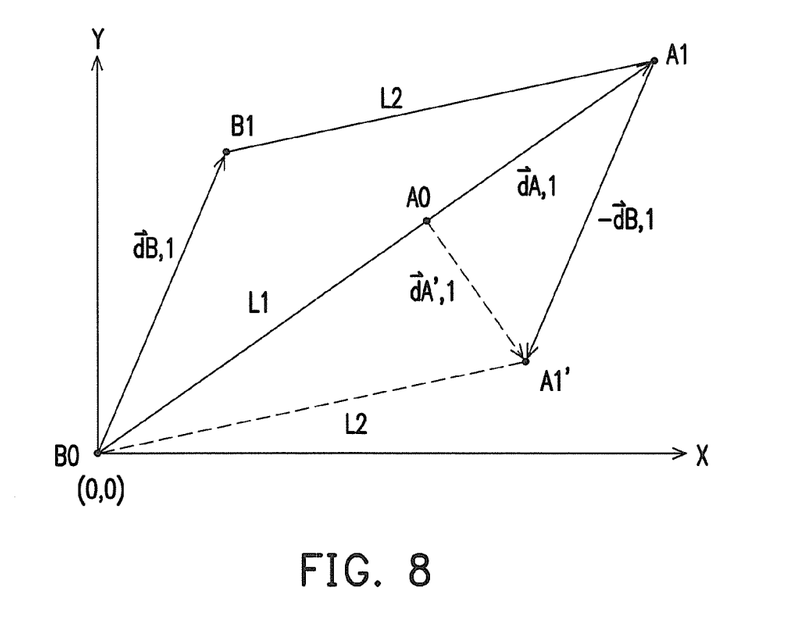
FIG. 8 illustrates an example of the method for determining a relative position of an apparatus according to still another example of the disclosure.

Specifically, FIG. 8 illustrates an example of the method for determining a relative position of an apparatus according to still another example of the disclosure. Referring to FIG. 7 and FIG. 8 together, in FIG. 8, a point $B_0$ (i.e. coordinates (0,0)) represents the initial position of the electronic apparatus 75 in FIG. 7, and a point $A_0$ represents the initial position of the electronic apparatus 70 in FIG. 7. In addition, points $A_1$ and $B_1$ respectively indicate the positions of the electronic apparatuses 70 and 75 after the unit time t.

The distance $L_1$ from the point $A_0$ to the point $B_0$ in FIG. 8 is the first distance $L_1$ in FIG. 7. The distance $L_2$ from the point $A_1$ to the point $B_1$ in FIG. 8 is the second distance $L_2$ in FIG. 7. The vector $\overline{d}_{A,1}$ in FIG. 8 indicates the first displacement $d_{A,1}$ in FIG. 7. The vector $\overline{d}_{B,1}$ in FIG. 8 indicates the second displacement $d_{B,1}$ in FIG. 7. It is assumed that the point $B_0$ extends to the right parallel to a connecting line between the point $A_1$ and the point $B_1$ by the distance $L_2$ to arrive at the a point $A_1'$, and a vector from the point $A_0$ to the point $A_1'$ is defined as $\overline{d}_{A,1}'$. By connecting the points $A_0$, $A_1$, $B_0$ and $A_1'$ with lines, a parallelogram is formed, and the vector $\overline{d}'_{A,1}$ is a difference between the vectors $\overline{d}_{A,1}$ and $\overline{d}_{B,1}$. By taking the distances $L_1$, $L_2$ and the vector $\overline{d}'_{A,1}$ in FIG. 8 as three sides of a triangle, according to the triangle inequality described in FIG. 4A, the coordinates of the point $A_1'$ and a vector $\overline{A}_1'$ from the point $B_0$ to the point $A_1'$ are obtained. Since a parallelogram is formed by connecting the points $A_0$, $A_1$, $B_0$ and $A_1'$ with lines, the vector from the point $B_1$ to the point $A_1$ is also $\overline{A}_1'$. Finally, the point $A_1$ is used as the reference point, so as to obtain the first relative position of the electronic apparatus 75 relative to the electronic apparatus 70 currently.

In this way, even if the user and his/her friend both move, it is still possible for the user to obtain the relative position of his/her friend relative to himself/herself by the method for determining a relative position of an apparatus according to the examples of the disclosure.

It is to be noted that all of the above examples obtain the relative position of another apparatus relative to the electronic apparatus itself without using a positioning system. However, in an example, if one of the electronic apparatus held by the user or other nearby apparatuses is capable of performing positioning using the positioning system, the method for determining a relative position of an apparatus according to the examples of the disclosure further combines the above obtained relative position with an absolute position (e.g. longitude and latitude coordinates) obtained by positioning the apparatus mentioned here, so as to obtain the absolute positions of all the apparatuses.

Figure 9:
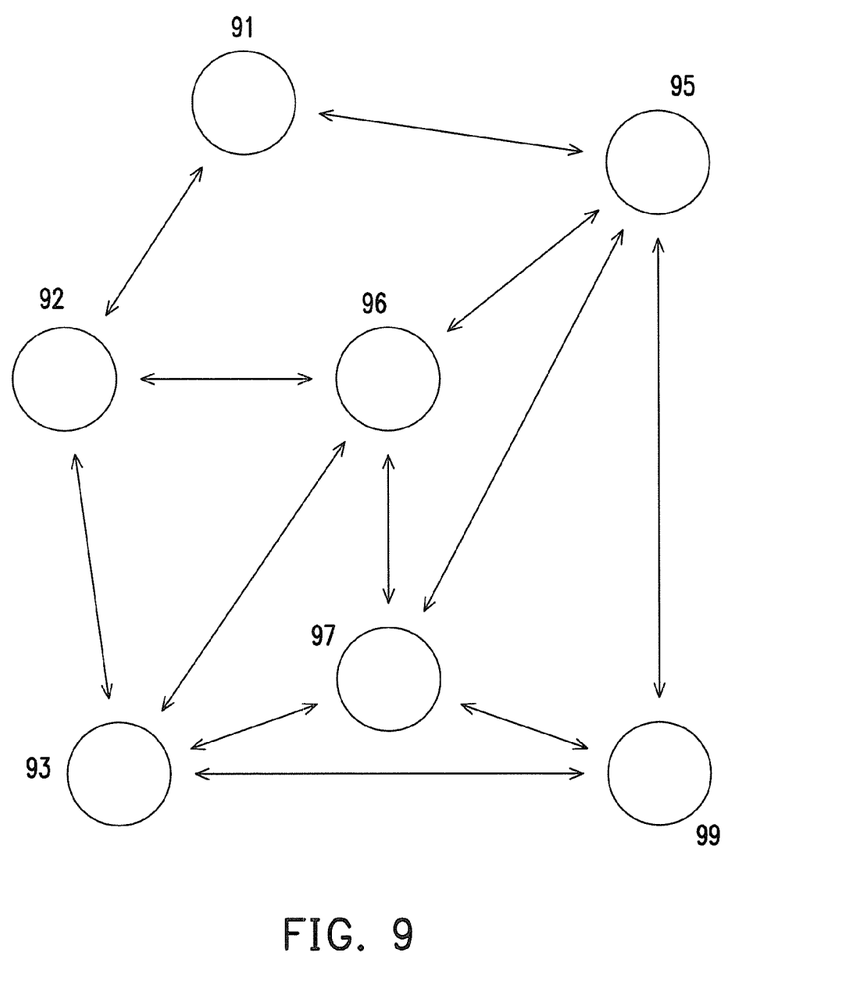
FIG. 9 is a schematic diagram of the method for determining a relative position of an apparatus according to still another example of the disclosure.

For example, FIG. 9 is a schematic diagram of applying the method for determining a relative position of an apparatus according to still another example of the disclosure. Referring to FIG. 9, electronic apparatuses 91 to 99 respectively detect nearby electronic apparatuses by using the method according to the above examples to obtain the relative positions of these electronic apparatuses relative to one another. The method for obtaining the relative position may be understood by referring to relevant descriptions of FIGS. 2 to 8, and details thereof are omitted herein. In an example, it is assumed that the electronic apparatus 91 held by the user is provided with a positioning system (not illustrated), and this positioning system supports at least one of the following systems: Global Positioning System (GPS), Assisted Global Positioning System (AGPS), Galileo Positioning System, or GLObal NAvigation Satellite System (GLONASS), but is not limited to the above. A base station or a Wi-Fi hotspot may also be used for positioning. The electronic apparatus 91 performs positioning by the positioning system so as to obtain its absolute position (e.g. GPS longitude and latitude coordinates). Moreover, according to the absolute position of the electronic apparatus 91 and the relative position of the electronic apparatus 95 relative to the electronic apparatus 91, the electronic apparatus 91 uses an absolute-position computation module (not illustrated) for computing an absolute position of the electronic apparatus 95 (e.g. by converting the coordinates of the relative position into longitude and latitude coordinates and then performing addition or subtraction with the absolute position depending on directions). In the same way, the other electronic apparatuses may obtain their respective absolute positions.

In another example, it is assumed that the electronic apparatus 91 held by the user is not capable of using a positioning system, but the electronic apparatus 92 is provided with a positioning system. In this case, the electronic apparatus 92 performs positioning by using the positioning system to obtain its absolute position, and transmits this absolute position to the electronic apparatus 91. Accordingly, according to the received absolute position of the electronic apparatus 92 and a relative position of the electronic apparatus 92 relative to the electronic apparatus 91, the electronic apparatus 91 uses the absolute-position computation module (not illustrated) for computing the absolute position of the electronic apparatus 91 (e.g. by converting the coordinates of the relative position into longitude and latitude coordinates and then performing addition or subtraction with the absolute position depending on directions). In the same way, the other electronic apparatuses may obtain their respective absolute positions.

In another example, it is assumed that the electronic apparatuses 91 to 99 are unable to perform positioning, but one of the users of the electronic apparatuses 91 to 99 has known his/her absolute position. In this case, this user selects his/her current position by clicking on the map or by selecting from the menu, and then transmits this current absolute position to the other electronic apparatuses, so that the other electronic apparatuses may obtain their respective absolute positions.

Accordingly, when the electronic apparatuses establish connections between each other by wireless signals (e.g. Wi-Fi), a network topology as shown in FIG. 9 is formed. As long as one of the electronic apparatuses is capable of performing positioning through the positioning system or receiving information about its current absolute position, the other electronic apparatuses in the network topology are capable of obtaining their respective absolute positions.

In addition, in another example, after two users respectively holding the electronic apparatus 10 and the electronic apparatus 20 initiate a function of determining the relative positions of their counterparts and complete authentication or pairing by, for example, NFC, the electronic apparatus 10 and the electronic apparatus 20 may use their current positions as starting points and use a sensor such as an accelerometer, a gyro sensor, a compass, and so on for respectively detecting and computing displacement trajectories and share their own displacement trajectory with another electronic apparatus. In this way, the electronic apparatus 10 and the electronic apparatus 20 may calculate the relative positions of their counterparts according to the information about the starting points and about the displacement trajectories of the electronic apparatus 10 and the electronic apparatus 20. Or, the electronic apparatus 20 shares its own displacement trajectory with the electronic apparatus 10 in a one-way manner, so that the electronic apparatus 10 calculates the relative position of the electronic apparatus 20. In this way, the two electronic apparatuses may calculate the relative positions of their counterparts simply by the displacement trajectories, without using triangulation.

Moreover, the function of determining the relative positions of their counterparts may be activated when it is necessary to learn the relative positions of their counterparts, or communication for authentication or pairing may be performed only when it is necessary to use the function of determining the relative positions of their counterparts. For example, the two users activate a relevant application program and perform pairing, for example in an NFC manner, and then start to track the relative positions of their counterparts by using the positions at which they perform the pairing as the starting points, so as to display the starting points and the moving trajectories of their counterparts on the electronic apparatuses.

The disclosure also provides a computer readable medium having a computer program recorded therein. The computer program is configured to execute the steps of the above method for determining a relative position of an apparatus. This computer program consists of a plurality of program code segments (e.g. code segments for building up structural figures, code segments for checking tables, code segments for settings and code segments for configuration), and after these code segments are loaded into an electronic apparatus and executed, the steps of the above method for determining a relative position of an apparatus are completed.

In summary, in the method, electronic apparatus and computer readable medium for determining a relative position of an apparatus according to the disclosure, the electronic apparatus transmits or receives wireless signals respectively at two different time points to detect the other nearby apparatuses, and measures the signal strength or round-trip time of the signals returned by these apparatuses, so as to compute the distances between the electronic apparatus and the other apparatuses. In addition, the electronic apparatus uses the sensor to detect the displacement of itself, and combines this displacement with the above computed distances, so as to compute the relative positions of the other apparatuses relative to the electronic apparatus. Finally, the relative positions of these electronic apparatuses are displayed on the screen of the electronic apparatus through a graphical interface. Accordingly, in a place where a positioning system is unavailable or not preferred by the user, the user is able to know the relative position of other nearby apparatus relative to himself/herself.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A method for determining a relative position of an apparatus, adapted for a first electronic apparatus to determine a relative position of a second electronic apparatus, the method comprising:
    computing a first distance between the first and the second electronic apparatus according to a first wireless signal transmitted between the first and the second electronic apparatus at a first time point;
    computing a second distance between the first and the second electronic apparatus according to a second wireless signal transmitted between the first and the second electronic apparatus at a second time point after the first time point by a first unit time, and computing a first displacement that the first electronic apparatus moves within the first unit time;
    computing a third distance between the first and the second electronic apparatus according to a third wireless signal transmitted between the first and the second electronic apparatus at a third time point after the second time point by a second unit time, and computing a second displacement that the first electronic apparatus moves within the second unit time;
    computing a first relative position of the second electronic apparatus relative to the first electronic apparatus according to the first distance, the first displacement and the second distance, and the second displacement and the third distance and by using a current position of the first electronic apparatus as a reference point;
    computing a k-th distance between the first and the second electronic apparatus according to a k-th wireless signal transmitted between the first and the second electronic apparatus at a k-th time point after the (k−1)-th time point by a (k−1)-th unit time;
    computing a (k+1)-th distance between the first and the second electronic apparatus according to a (k+1)-th wireless signal transmitted between the first and the second electronic apparatus at a (k+1)-th time point after the k-th time point by a k-th unit time, and computing a k-th displacement that the first electronic apparatus moves within the k-th unit time, wherein k is a positive integer; and
    computing a minimum error value between a (k−1)-th relative position of the second electronic apparatus relative to the first electronic apparatus and a k-th relative position of the second electronic apparatus relative to the first electronic apparatus according to the k-th displacement, the k-th distance and the (k+1)-th distance to determine the k-th relative position of the second electronic apparatus relative to the first electronic apparatus.

2. The method of claim 1, further comprising:
    accessing the previously computed first to k-th relative positions of the second electronic apparatus relative to the first electronic apparatus;
    correcting the first to k-th relative positions respectively as k corrected positions relative to the reference point according to the first to k-th displacements by using the current position of the first electronic apparatus as the reference point; and
    displaying the corrected positions through a graphical interface with the reference point at the center to indicate a moving trajectory of the second electronic apparatus relative to the reference point.

3. The method of claim 1, wherein after the steps of computing the first displacement that the first electronic apparatus moves within the first unit time, and of computing the second distance of the second electronic apparatus relative to the first electronic apparatus according to the wireless signal, the method further comprises:
    the second electronic apparatus computing a third displacement that the second electronic apparatus moves within the first unit time and transmitting the third displacement to the first electronic apparatus; and
    computing the first relative position of the second electronic apparatus relative to the first electronic apparatus according to the first distance, a difference between the first displacement and the third displacement, and the second distance and by using the first electronic apparatus as the reference point.

4. The method of claim 1, further comprising:
    initiating a specific application program; and
    communicating with the second electronic apparatus in a near-field communication manner to perform an authentication and/or pairing procedure.

5. The method of claim 1, wherein the step of computing the first distance between the first and the second electronic apparatus comprises:
    transmitting the first wireless signal;
    receiving a feedback signal returned from the second electronic apparatus in response to the first wireless signal; and
    comparing a signal strength of the feedback signal with a distance conversion table to obtain the first distance.

6. The method of claim 1, wherein the step of computing the first displacement that the first electronic apparatus moves within the first unit time comprises:
    computing the first displacement by using sensing information received by an accelerometer, a gyro sensor, an electronic compass, or a combination thereof.

7. The method of claim 1, wherein after the step of computing the first relative position of the second electronic apparatus relative to the first electronic apparatus, the method further comprises:
    displaying the first relative position through a graphical interface with the reference point at the center.

8. The method of in claim 1, wherein at the second time point after the first time point by the first unit time, the method further comprises:
    positioning the first electronic apparatus by using a positioning system to obtain a first absolute position of the first electronic apparatus; and
    computing a second absolute position of the second electronic apparatus according to the first absolute position and the first relative position.

9. The method of in claim 1, wherein at the second time point after the first time point by the first unit time, the method further comprises:
    the second electronic apparatus performing positioning by using a positioning system obtain a second absolute position and transmitting the second absolute position to the first electronic apparatus; and
    the first electronic apparatus computing a first absolute position of the first electronic apparatus according to the second absolute position and the first relative position.

10. An electronic apparatus, comprising:
    a wireless communication unit transmitting a wireless signal with a second electronic apparatus;
    at least one sensor;
    a storage unit recording a plurality of modules; and
    one or more processing units connected to the wireless communication unit, the sensor, and the storage unit to access and execute the modules recorded in the storage unit, the modules comprising:
a distance computation module, computing a first distance between the electronic apparatus and the second electronic apparatus according to a first wireless signal transmitted between the first and the second electronic apparatus at a first time point; computing a second distance between the electronic apparatus and the second electronic apparatus according to a second wireless signal transmitted between the first and the second electronic apparatus at a second time point after the first time point by a first unit time; and computing a third distance between the electronic apparatus and the second electronic apparatus according to a third wireless signal transmitted between the first and the second electronic apparatus at a third time point after the second time point by a second unit time;
a displacement computation module, detecting and computing a first displacement that the electronic apparatus moves within the first unit time and a second displacement that the electronic apparatus moves within the second unit time by using the sensor; and
a relative-position computation module, compute a first relative position of the second electronic apparatus relative to the electronic apparatus according to the first distance, the first displacement and the second distance, and the second displacement and the third distance and by using a current position of the electronic apparatus as a reference point, wherein
the distance computation module computes a k-th distance between the electronic apparatus and the second electronic apparatus according to a k-th wireless signal transmitted between the first and the second electronic apparatus at a k-th time point after the (k−1)-th time point by a (k−1)-th unit time;
the distance computation module computes a (k+1)-th distance between the electronic apparatus and the second electronic apparatus according to a (k+1)-th wireless signal transmitted between the first and the second electronic apparatus at a (k+1)-th time point after the k-th time point by a k-th unit time, and the displacement computation module uses the sensor for detecting and computing a k-th displacement that the electronic apparatus moves within the k-th unit time, wherein k is a positive integer; and
the relative-position computation module computes a minimum error value between a (k−1)-th relative position of the second electronic apparatus relative to the first electronic apparatus at the (k+1)-th time point and a k-th relative position of the second electronic apparatus relative to the electronic apparatus at a (k+2)-th unit time according to the k-th displacement, the k-th distance and the (k+1)-th distance to determine the k-th relative position of the second electronic apparatus relative to the electronic apparatus.

11. The electronic apparatus of claim 10, wherein electronic apparatus further comprises a display unit, and the modules further comprise a display module, wherein
the relative-position computation module accesses the previously computed first to k-th relative positions of the second electronic apparatus relative to the electronic apparatus,
the relative-position computation module corrects the first to k-th relative positions respectively as k corrected positions relative to the reference point according to the first to k-th displacements by using the current position of the electronic apparatus as the reference point, and
the display module displays the corrected positions on the display unit through a graphical interface with the reference point at the center to indicate a moving trajectory of the second electronic apparatus relative to the reference point.

12. The electronic apparatus of claim 11, wherein the second electronic apparatus computes a second displacement that the second electronic apparatus moves within the first unit time and transmits the second displacement to the electronic apparatus, wherein
the relative-position computation module further computes the first relative position of the second electronic apparatus relative to the electronic apparatus according to a triangle inequality by using the electronic apparatus as the reference point, and using the first distance, a difference between the first displacement and the second displacement, and the second distance as three sides of a triangle.

13. The electronic apparatus of claim 10, further comprising a specific application program, wherein after the specific application program is niti ated, the electronic apparatus communicates with the second electronic apparatus in a near-field communication manner to perform an authentication and/or pairing procedure.

14. The electronic apparatus of claim 10, wherein the distance computation module further transmits the first wireless signal and receiving a feedback signal returned from the second electronic apparatus in response to the first wireless signal by using the wireless communication unit, and compares a signal strength of the feedback signal with a distance conversion table to obtain the first distance.

15. The electronic apparatus of claim 10, wherein the sensor comprises one or a combination of an accelerometer, a gyro sensor, and a compass.

16. The electronic apparatus of claim 10, further comprising:
a positioning system connected to the processing unit, positioning the electronic apparatus to obtain a first absolute position of the electronic apparatus, the modules further comprise:
an absolute-position computation module, computing a second absolute position of the second electronic apparatus according to the first absolute position and the first relative position.

17. The electronic apparatus of claim 10, wherein the second electronic apparatus further performs positioning by using a positioning system to obtain a second absolute position and transmit the second absolute position to the electronic apparatus, and the modules of the electronic apparatus further comprise:
an absolute-position computation module, computing a first absolute position of the electronic apparatus according to the second absolute position and the first relative position.

18. A non-transitory computer readable medium having a program recorded therein, and the program executes the following steps through a first electronic apparatus:
computing a first distance between the first electronic apparatus and a second electronic apparatus according to a first wireless signal transmitted between the first and the second electronic apparatus at a first time point;
computing a second distance between the first and the second electronic apparatus according to a second wireless signal transmitted between the first and the second electronic apparatus at a second time point after the first time point by a first unit time, and computing a first displacement that the first electronic apparatus moves within the first unit time;

computing a third distance between the first and the second electronic apparatus according to a third wireless signal transmitted between the first and the second electronic apparatus at a third time point after the second time point by a second unit time, and computing a second displacement that the first electronic apparatus moves within the second unit time;

computing a first relative position of the second electronic apparatus relative to the first electronic apparatus according to the first distance, the first displacement and the second distance, and the second displacement and the third distance and by using a current position of the first electronic apparatus as a reference point;

computing a k-th distance between the first and the second electronic apparatus according to a k-th wireless signal transmitted between the first and the second electronic apparatus at a k-th time point after the (k−1)-th time point by a (k−1)-th unit time;

computing a (k+1)-th distance between the first and the second electronic apparatus according to a (k+1)-th wireless signal transmitted between the first and the second electronic apparatus at a (k+1)-th time point after the k-th time point by a k-th unit time, and computing a k-th displacement that the first electronic apparatus moves within the k-th unit time, wherein k is a positive integer; and computing a minimum error value between a (k−1)-th relative position of the second electronic apparatus relative to the first electronic apparatus at a (k+1)-th time point and a k-th relative position of the second electronic apparatus relative to the first electronic apparatus at a (k+2)-th time point according to the k-th displacement, the k-th distance and the (k+1)-th distance to determine the k-th relative position of the second electronic apparatus relative to the first electronic apparatus.

* * * * *